United States Patent
Shoda et al.

(10) Patent No.: US 8,045,238 B2
(45) Date of Patent: Oct. 25, 2011

(54) IMAGE PROCESSING APPARATUS, IMAGE PROCESSING METHOD AND IMAGE READING APPARATUS

(75) Inventors: Hirokazu Shoda, Yokohama (JP); Satomi Hoshino, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 500 days.

(21) Appl. No.: 12/206,114

(22) Filed: Sep. 8, 2008

(65) Prior Publication Data

US 2009/0073477 A1 Mar. 19, 2009

Related U.S. Application Data

(60) Provisional application No. 60/972,490, filed on Sep. 14, 2007.

(51) Int. Cl.
  *H04N 1/40* (2006.01)
(52) U.S. Cl. ........ 358/462; 358/1.13; 358/1.9; 358/521; 382/167
(58) Field of Classification Search .................. 358/462, 358/1.13, 1.9, 521; 382/167
  See application file for complete search history.

(56) References Cited

U.S. PATENT DOCUMENTS

| | | | |
|---|---|---|---|
| 5,539,523 A | | 7/1996 | Nakai et al. |
| 5,937,087 A * | | 8/1999 | Sasanuma et al. ............ 382/167 |
| 6,154,288 A * | | 11/2000 | Watanabe ...................... 358/1.9 |
| 6,927,876 B1 * | | 8/2005 | Kondo ........................... 358/1.9 |
| 7,307,754 B2 * | | 12/2007 | Motoyama et al. ............ 358/1.9 |
| 7,450,280 B2 * | | 11/2008 | Hayashi ........................ 358/521 |
| 2005/0135853 A1 | | 6/2005 | Ide et al. |
| 2006/0007465 A1 * | | 1/2006 | Hayashi ...................... 358/1.13 |

FOREIGN PATENT DOCUMENTS

| | | |
|---|---|---|
| JP | 05-276369 | 10/1993 |
| JP | 08-317240 | 11/1996 |
| JP | 10-322568 | 12/1998 |
| JP | 2005-184497 | 7/2005 |

* cited by examiner

*Primary Examiner* — Twyler Haskins
*Assistant Examiner* — Michael Burleson
(74) *Attorney, Agent, or Firm* — Turocy & Watson, LLP

(57) ABSTRACT

An image processing apparatus includes a first log conversion unit configured to execute gradation conversion processing for copying on an image signal generated by reading an original, an output-signal converting unit configured to generate an output signal from the image signal subjected to the gradation conversion processing for copying and output the output signal to an output apparatus, a second log conversion unit configured to be provided independently from the first log conversion unit and execute gradation conversion processing for specific original detection on the image signal generated by reading the original, and a specific-original detecting unit configured to detect whether the original is a specific original from the image signal subjected to the gradation conversion processing for specific original detection.

20 Claims, 4 Drawing Sheets

For RGB

For monochrome

IMAGE PROCESSING APPARATUS, IMAGE PROCESSING METHOD AND IMAGE READING APPARATUS

CROSS-REFERENCE TO RELATED APPLICATION

This application is based upon and claims the benefit of U.S. Provisional Application No. 60/972,490, filed Sep. 14, 2007.

TECHNICAL FIELD

The present invention relates to an image processing apparatus, an image processing method, and an image reading apparatus for processing image signals including specific originals such as bills and marketable securities.

BACKGROUND

In general, in an image forming apparatus such as a digital copying machine that handles image information, reading means such as a scanner reads an original. Image information read and digitized is multi-valued, processed according to a purpose, and outputted from an output apparatus such as a laser printer.

An image forming apparatus such as a color multifunction peripheral that forms a color image has a specific image discriminating function. The specific image discriminating function discriminates whether a read original is a specific original such as a bill or a marketable security. When an input image is the specific original, an output apparatus prohibits copying of the input image by, for example, entirely painting the image in black (JP-A-2005-184497).

SUMMARY

An image processing apparatus according to a first aspect of the present invention includes a first log conversion unit configured to execute gradation conversion processing for copying on an image signal generated by reading an original; an output-signal converting unit configured to generate an output signal from the image signal subjected to the gradation conversion processing for copying and output the output signal to an output apparatus, a second log conversion unit configured to be provided independently from the first log conversion unit and execute gradation conversion processing for specific original detection on the image signal generated by reading the original, and a specific-original detecting unit configured to detect whether the original is a specific original from the image signal subjected to the gradation conversion processing for specific original detection.

An image processing method according to a second aspect of the present invention includes executing gradation conversion processing for copying on an image signal generated by reading an original, generating an output signal from the image signal subjected to the gradation conversion processing for copying and outputting the output signal to an output apparatus, executing gradation conversion processing for specific original detection on the image signal generated by reading the original, detecting whether the original is a specific original from the image signal subjected to the gradation conversion processing for specific original detection, and executing the gradation conversion processing for copying and the gradation conversion processing for specific original detection independently from each other.

An image reading apparatus according to a third aspect of the present invention includes an input unit configured to read an original and generate an image signal, a first log conversion unit configured to execute gradation conversion processing for copying on an image signal generated by reading an original, an output-signal converting unit configured to generate an output signal from the image signal subjected to the gradation conversion processing for copying and output the output signal to an output apparatus, a second log conversion unit configured to be provided independently from the first log conversion unit and execute gradation conversion processing for specific original detection on the image signal generated by reading the original, and a specific-original detecting unit configured to detect whether the original is a specific original from the image signal subjected to the gradation conversion processing for specific original detection.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION

An image processing apparatus, an image processing method, and an image reading apparatus according to an embodiment of the present invention are explained with reference to the accompanying drawings.

Figure 1:
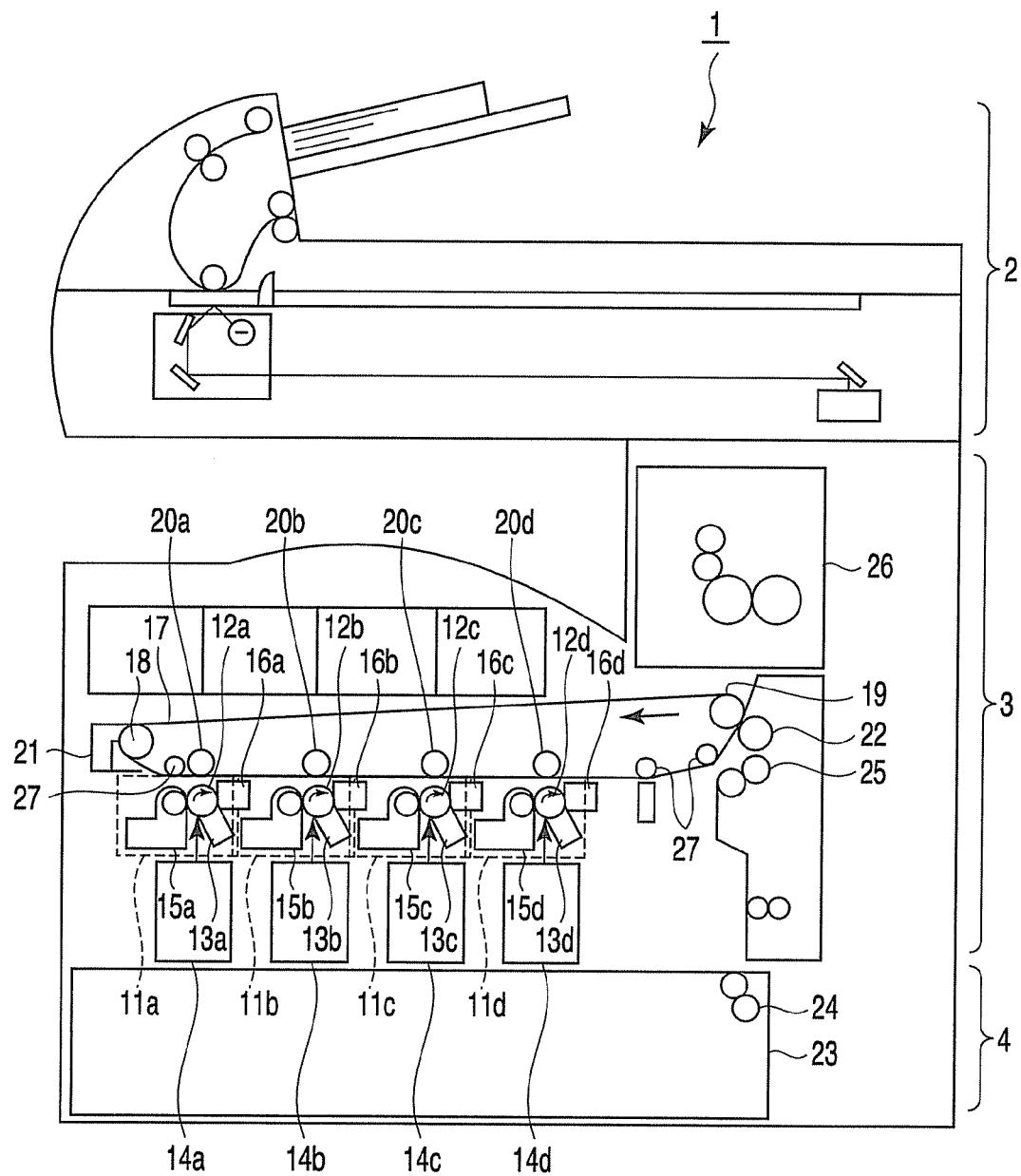
FIG. 1 is a diagram showing an image forming apparatus.

FIG. 1 is a diagram showing a configuration example of a tandem image forming apparatus 1 mounted with an image processing apparatus. As shown in FIG. 1, the image forming apparatus 1 includes a scanner unit 2, an image forming unit 3, and a paper feeding unit 4.

The scanner unit 2 irradiates light on an original set on an original stand, guides reflected light from the original to a light-receiving element via plural optical members, photoelectrically converts the reflected light, and supplies an image signal to the image forming unit 3.

The image forming unit 3 includes four process cartridges 11a, 11b, 11c, and 11d. The process cartridges 11a, 11b, 11c, and 11d correspond to yellow (Y), magenta (M), cyan (C), and black (K) and have photoconductive drums 12a, 12b, 12c, and 12d, respectively. The image forming unit 3 forms toner images on the photoconductive drums 12a, 12b, 12c, and 12d.

The photoconductive drums 12a is a cylinder that rotates in an arrow direction in the figure. An electrifying charger 13a is opposed to the surface of the photoconductive drum 12a. The electrifying charger 13a negatively charges the photoconductive drum 12a uniformly. An exposing device 14a exposes, in order to form an electrostatic latent image, the photoconductive drum 12a, which is charged by the electrifying charger 13a, using a laser beam optically modulated according to an image signal supplied from the scanner unit 2. The exposing device 14a may use an LED (Light Emitting Diode) instead of the laser beam.

A developing device 15a reversely develops the electrostatic latent image, which is formed by the exposing device 14a, further on a downstream side of the exposing device 14a. A yellow (Y) developer is stored in the developing device 15a.

An intermediate transfer belt 17 comes into contact with the photoconductive drum 12a on the downstream side of the developing device 15a.

The intermediate transfer belt 17 has length (width) equal to the length in an axial direction of the photoconductive drum 12a in a direction (a depth direction in the figure) orthogonal to a conveying direction of the intermediate transfer belt 17. The intermediate transfer belt 17 is laid over a driving roller 18 that rotates the belt and a secondary transfer counter roller 19 as a driven roller. Tension rollers 27 on a downstream side of the driving roller 18 holds the intermediate transfer belt 17 at fixed tension.

A toner cleaner 16a is provided further on the downstream side than a contact position of the photoconductive drum 12a and the intermediate transfer belt 17. The toner cleaner 16a removes, with a cleaning blade, a residual toner remaining on the photoconductive drum 12a after a toner is transferred onto the intermediate transfer belt 17.

Process cartridges 11a, 11b, 11c, and 11d are sequentially arranged between the driving roller 18 and the secondary transfer counter roller 19 along the conveying direction of the intermediate transfer belt 17. All the process cartridges 11b, 11c, and 11d have a configuration same as that of the process cartridge 11a.

The photoconductive drums 12b, 12c, and 12d are in the centers of the process cartridges 11b, 11c, and 11d, respectively. Electrifying chargers 13b, 13c, and 13d are opposed to the surfaces of the photoconductive drums 12b, 12c, and 12d, respectively. Exposing devices 14b, 14c, and 14d expose the charged photoconductive drums 12b, 12c, and 12d and form electrostatic latent images thereon on the downstream side of the electrifying chargers 13b, 13c, and 13d. Developing devices 15b, 15c, and 15d reversely develop the electrostatic latent images, which are formed by the exposing devices 14b, 14c, and 14d, further on the downstream side of the exposing devices 14b, 14c, and 14d. Toner cleaners 16b, 16c, and 16d are provided further on the downstream side than contact positions of the photoconductive drums 12b, 12c, and 12d and the intermediate transfer belt 17. The developing devices 15b, 15c, and 15d store developers of magenta (M), cyan (C), and black (K), respectively.

The intermediate transfer belt 17 sequentially comes into contact with the photoconductive drums 12a to 12d. Primary transfer rollers 20a, 20b, 20c, and 20d are provided in association with the photoconductive drums 12a to 12d, respectively. The primary transfer rollers 20a to 20d come into contact with the rear surface of the intermediate transfer belt 17 above the photoconductive drums corresponding thereto. The primary transfer rollers 20a, 20b, 20c, and 20d are opposed to the process cartridges 11a to 11d via the intermediate transfer belt 17. The primary transfer rollers 20a to 20d are positively charged. The charged primary transfer rollers 20a to 20d transfer toner images formed on the surfaces of the photoconductive drums 12a to 12d onto the intermediate transfer belt 17, respectively.

An intermediate transfer belt cleaner 21 removes a residual toner on the intermediate transfer belt 17.

Below the image forming unit 3, a paper feeding cassette 23 of the paper feeding unit 4 stores sheets. Pickup rollers 24 pick up the sheets from the paper feeding cassette 23 one by one. A secondary transfer roller 22 and the secondary transfer counter roller 19 are opposed to each other across the intermediate transfer belt 17. A registration roller pair 25 feeds the sheet to a space between the secondary transfer roller 22 and the intermediate transfer belt 17 at predetermined timing.

Above the intermediate transfer belt 17, a fixing device 26 fixes the toner image on the sheet.

Figure 2:
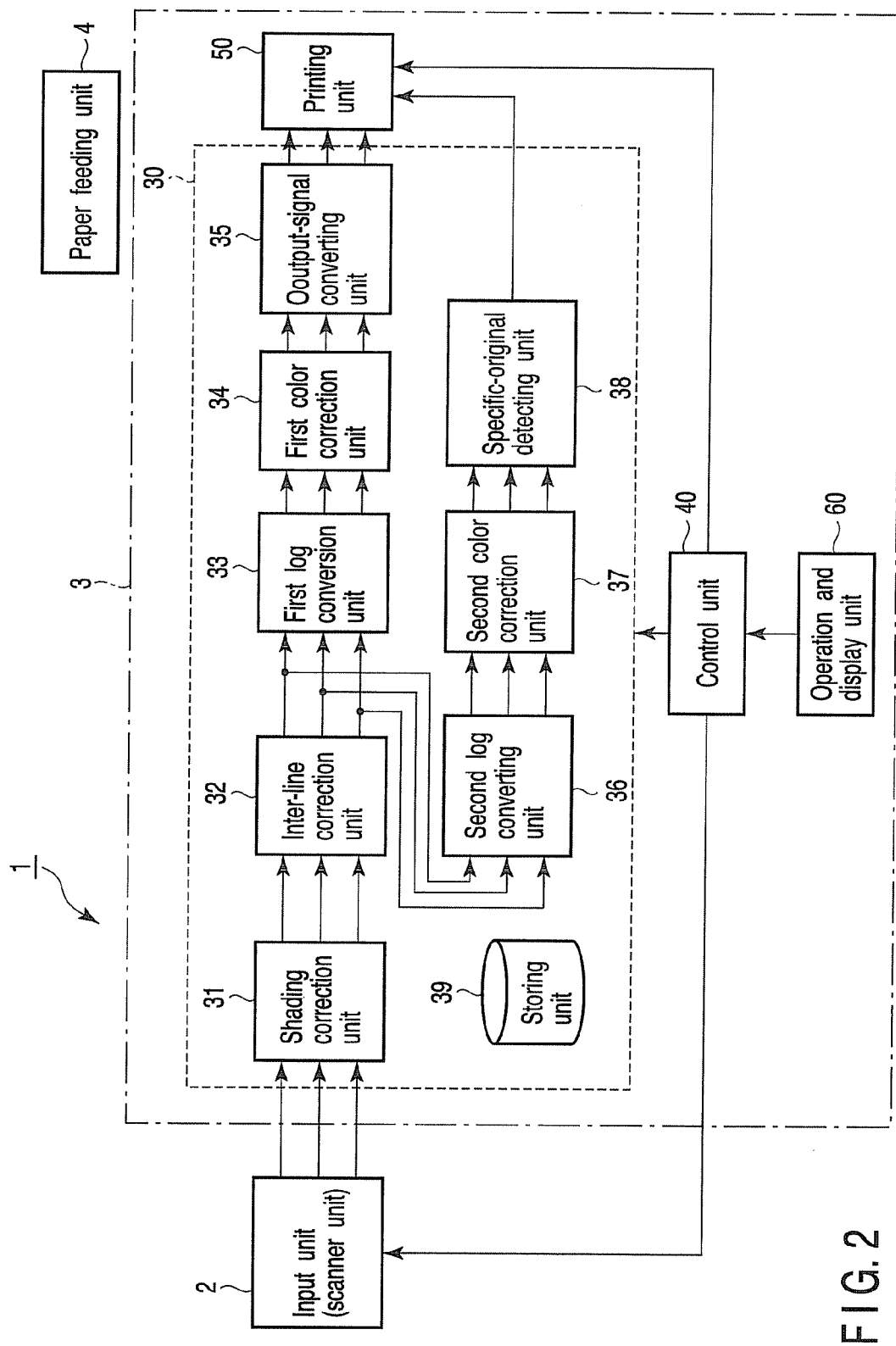
FIG. 2 is a block diagram showing a functional configuration example of an image forming unit.

FIG. 2 is a block diagram showing a functional configuration example of the image forming unit 3. A configuration and operations of the image processing unit 3 are explained below.

The image forming unit 3 includes an image processing unit 30, a control unit 40, a printing unit 50, and an operation and display unit 60. The image processing unit 30 converts an image signal read by the scanner unit 2 as an input unit into a printing signal and outputs the printing signal to the printing unit 50. The control unit 40 controls operations of the scanner unit 2, the image processing unit 30, and the printing unit 50. The operation and display unit 60 exchanges instruction information and display information concerning an image forming operation with the control unit 40. The operation and display unit 60 outputs a density adjustment value set by a user to the image processing unit 30 via the control unit 40.

The image processing unit 30 includes a shading correction unit 31, an inter-line correction unit 32, a first log conversion unit 33, a first color correction unit 34, an output-signal converting unit 35, a second log conversion unit 36, a second color correction unit 37, a specific-original detecting unit 38, and a storing unit 39.

The shading correction unit 31 corrects, in three-primary-color data of R, G, and B inputted from the scanner unit 2, sensitivity fluctuation in a CCD and a light distribution characteristic of a lamp for lighting an original. The inter-line correction unit 32 corrects physical positional deviation of respective R, G, and B sensors. Respective signals of R, G, and B, positional deviation of which is corrected by the inter-line correction unit 32, are branched to two paths, a path for copying and a path for specific original detection, and outputted.

The first log conversion unit 33 applies gradation conversion (Log conversion) and density adjustment for copying to an input signal. The first log conversion unit 33 is, for example, an LUT (Loop Up Table).

Figure 3A:
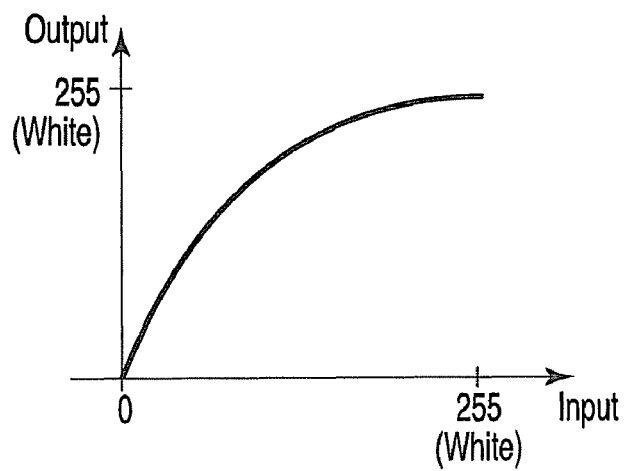
FIG. 3A is a diagram showing a setting example of a first log conversion unit.
Figure 3B:
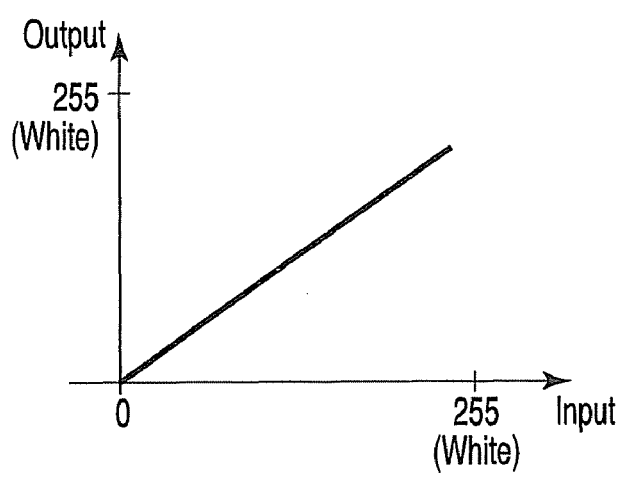
FIG. 3B is a diagram showing a setting example of the first log conversion unit.

FIG. 3A is a diagram showing a setting example of the first log conversion unit 33 for an RGB signal that represents a color image. FIG. 3B is a diagram showing a setting example of the first log conversion unit 33 for an RGB signal that represents a monochrome image.

A color image is often a photograph or the like that is required to have gradation properties. A shadow section has higher resolution in terms of a visual characteristic than a highlight section. Therefore, when an RGB signal represents a color image, gradation properties on a high-density side are improved and gradation properties on a low-density side are compressed. This is equivalent to setting, as shown in FIG. 3A, a rate of an increase in an output value to an increase in an input value larger in a range in which the input value is close to 0 than in a range in which the input value is close to 255.

A monochrome image is often a character that is required to have density. Therefore, when an RGB signal represents a monochrome image, as shown in, for example, FIG. 3B, a relation between an input value and an output value is set linear.

The user can select a signal conversion characteristic of the first log conversion unit 33 out of, for example, signal conversion characteristics shown in FIGS. 3A and 3B using the operation and display unit 60.

Figure 4:
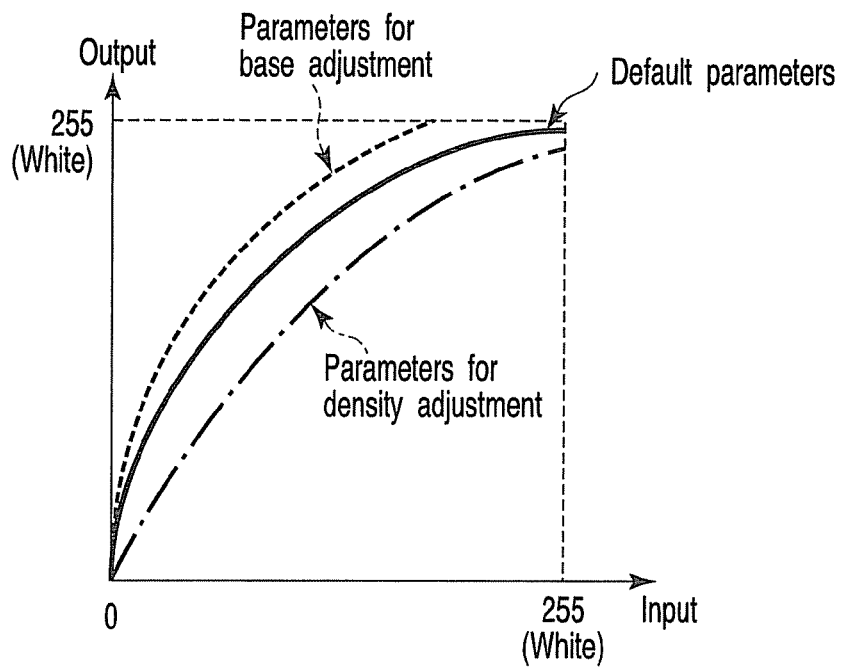
FIG. 4 is a diagram showing a setting example of the first log conversion unit.

FIG. 4 is also a diagram showing a setting example of the first log conversion unit 33. A characteristic indicated by a solid line in the figure represents a signal conversion characteristic in a default state in which density conversion parameters are not changed. An alternate long and short dash line in the figure represents an example of a signal conversion characteristic obtained when the user changes the density conversion parameters. The alternate long and short dash line shifts downward compared with the default signal conversion characteristic. In the signal conversion characteristic represented by the alternate long and short dash line, compared with the default signal conversion characteristic, the density of an output value is higher than the density of an input value. A dotted line in the figure represents a characteristic obtained when the user selects density conversion parameters for base adjustment. The dotted line shifts upward compared with the default signal conversion characteristic. In the signal conversion characteristic represented by the dotted line, 255, i.e., white, is outputted in response to an input equal to or higher than a predetermined value.

The first color correction unit 34 converts an RGB signal into a CMY signal and performs γ characteristic correction concerning the printing unit 50. The first color correction unit 34 is, for example, an LUT. The user may change a relation between the RGB signal and the CMY signal in the first color correction unit 34 using the operation and display unit 60.

The output-signal converting unit 35 executes filtering, inking, half-tone processing, and the like and outputs a CMYK signal to the printing unit 50.

Figure 5:
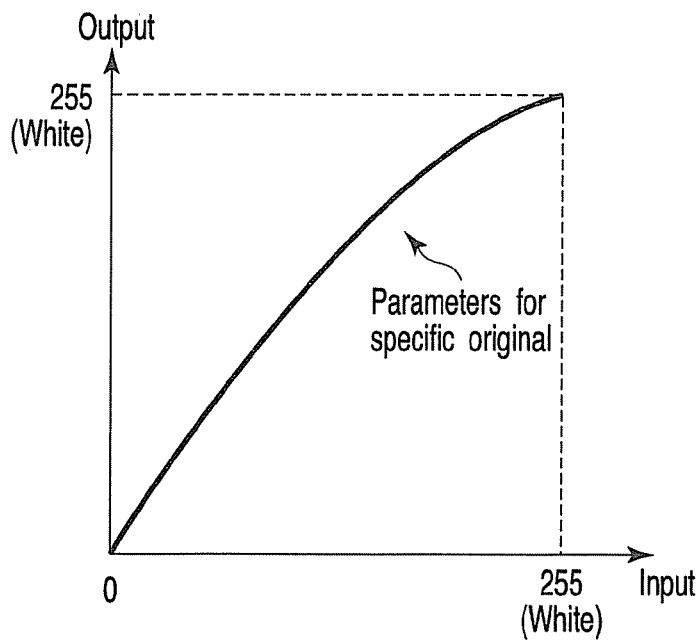
FIG. 5 is a diagram showing a setting example of a second log conversion unit.

The second log conversion unit 36 executes gradation conversion (Log conversion) processing for specific original detection. The second log conversion unit 36 is, for example, an LUT. FIG. 5 is a diagram showing an example of a signal conversion characteristic of the second log conversion unit 36. Even if the user changes the signal conversion characteristic of the first log conversion unit 33 using the operation and display unit 60, the signal conversion characteristic of the second log conversion unit 36 does not change. For example, the user cannot change the signal conversion characteristic of the second log conversion unit 36 using the operation and display unit 60. The user can change the signal conversion characteristic of the second log conversion unit 36, for example, after password authentication using the operation and display unit 60. Alternatively, the user can change the signal conversion characteristic of the second log conversion unit 36, for example, by connecting a dedicated jig thereto. The user cannot, for example, rewrite the signal conversion characteristic of the second log conversion unit 36.

The second color correction unit 37 converts an RGB signal into a CMY signal. Even if the user changes a relation between the RGB signal and the CMY signal in the first color correction unit 34 using the operation and display unit 60, a relation between the RGB signal and the CMY signal in the second color correction unit 37 does not change. For example, the user cannot change the relation between the RGB signal and the CMY signal in the second color correction unit 37 using the operation and display unit 60. The user can change the relation between the RGB signal and the CMY signal in the second color correction unit 37, for example, after password authentication using the operation and display unit 60. The user can change the relation between the RGB signal and the CMY signal in the second color correction unit 37, for example, by connecting a dedicated jig thereto. The user cannot, for example, rewrite the relation between the RGB signal and the CMY signal in the second color correction unit 37.

The specific-original detecting unit 38 checks whether an original read by the scanner unit 2 is a specific original such as a bill or a marketable security. The storing unit 39 stores a dictionary (specific image data) for detecting the specific original. The specific-original detecting unit 38 performs pattern matching between the CMY signal generated by the second color correction unit 37 and specific image data and generates a detection signal that indicates whether an image represented by the CMY signal is an image of the specific original. An input signal to the specific-original detecting unit 38 is the CMY signal in the above explanation. However, the input signal may be an RGB signal. In this case, the second color correction unit 37 converts the CMY signal into the RGB signal to improve a specific original detection ratio.

The control unit 40 controls, according to the detection signal, an output based on the CMYK signal in the printing unit 50. When the detection signal indicates that an image represented by the CMYK signal an image of the specific original, the control unit 40 prohibits an output based on the CMYK signal.

In the image processing apparatus in the past, a Log conversion table and a color correction processing function are used in common for copying and specific original detection. Therefore, when the user performs density adjustment for copying, gradation and color reproducibility of an image represented by a signal inputted to the specific-original detecting unit change. Therefore, specific original detection accuracy falls. On the other hand, the image processing apparatus according to the embodiment explained above is mounted with the log conversion unit and the color correction unit for copying and the log conversion unit and the color correction unit for specific original detection. The log conversion units and the color correction units independently provided for copying and specific original detection allow the user to perform image adjustment such as density adjustment without deteriorating detection accuracy of a specific original. The image forming unit is not limited to a mechanism for forming a color image with a toner. Any mechanism such as a mechanism for forming a color image with an ink may be adopted.

An image may be outputted to a PC via a network. The first color correction unit 34 may convert an RGB signal into a color signal for a display device (e.g., an sRGB signal). The output-signal converting unit 35 may apply processing such as filtering to the color signal for a display device.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:
a first log conversion unit configured to execute first gradation conversion processing for copying on an image signal generated by reading an original;

an output-signal converting unit configured to generate an output signal from the image signal subjected to the first gradation conversion processing for copying and to output the output signal to an output apparatus;

a second log conversion unit independent from the first log conversion unit and configured to execute second gradation conversion processing for specific original detection on the image signal generated by reading the original; and a specific-original detecting unit configured to detect whether the original is a specific original from the image signal subjected to the second gradation conversion processing for specific original detection;

wherein a first gradation conversion characteristic for copying of the first log conversion unit is changeable by a setting, and wherein a second gradation conversion characteristic for specific original detection of the second log conversion unit is changeable after password authentication.

2. The apparatus of claim 1, wherein
the first log conversion unit is configured to execute the first gradation conversion processing using a first conversion unit that defines the first gradation conversion characteristic for copying, and
the second log conversion unit is configured to execute the second gradation conversion processing using a first conversion table that defines the second gradation conversion characteristic for specific original detection.

3. The apparatus of claim 2, wherein the first log conversion unit is configured to execute density adjustment processing using an adjustable density adjustment value.

4. The apparatus of claim 3, wherein the first gradation conversion characteristic for copying and a third gradation conversion characteristic for density adjustment processing are defined in combination in a second conversion table.

5. The apparatus of claim 4, wherein only the second gradation conversion characteristic for specific original detection is defined in the first conversion table.

6. The apparatus of claim 1, wherein the specific-original detecting unit is configured to output a detection signal that indicates whether the original is the specific original.

7. An image processing method comprising:
executing first gradation conversion processing for copying on an image signal generated by reading an original using a first gradation conversion characteristic for copying, the first gradation conversion characteristic changeable by a setting;
generating an output signal from the image signal subjected to the first gradation conversion processing for copying and outputting the output signal to an output apparatus;
executing second gradation conversion processing for specific original detection on the image signal generated by reading the original using a second gradation conversion characteristic for specific original detection, the second gradation conversion characteristic changeable after password authentication;
detecting whether the original is a specific original from the image signal subjected to the second gradation conversion processing for specific original detection; and
executing the first gradation conversion processing for copying and the second gradation conversion processing for specific original detection independently from each other.

8. The method of claim 7, further comprising:
executing the first gradation conversion processing using a first conversion table that defines the first gradation conversion characteristic for copying, and
executing the second gradation conversion processing using a second conversion table that defines the second gradation conversion characteristic for specific original detection.

9. The method of claim 8, further comprising:
in the execution of the first gradation conversion processing for copying, executing density adjustment processing using a configurable density adjustment value.

10. The method of claim 9, wherein the first gradation conversion characteristic for copying and a third gradation conversion characteristic for density adjustment processing are defined in combination in the first conversion table.

11. The method of claim 10, wherein only the second gradation conversion characteristic for specific original detection is defined in the second conversion table.

12. The method of claim 7, further comprising:
outputting a detection signal that indicates whether the original is the specific original.

13. An image reading apparatus comprising:
an input unit configured to read an original and generate an image signal;
a first log conversion unit configured to execute first gradation conversion processing for copying on an image signal generated by reading an original, wherein the first log conversion unit employs a first gradation conversion characteristic for copying that is changeable by a setting to execute the first gradation conversion processing;
an output-signal converting unit configured to generate an output signal from the image signal subjected to the first gradation conversion processing for copying and to output the output signal to an output apparatus;
a second log conversion unit configured to operate independently from the first log conversion unit and to execute second gradation conversion processing for specific original detection on the image signal generated by reading the original, wherein the second log conversion unit employs a second gradation conversion characteristic for specific original detection that is changeable after password authentication to execute the second gradation conversion processing; and
a specific-original detecting unit configured to detect whether the original is a specific original from the image signal subjected to the second gradation conversion processing for specific original detection.

14. The apparatus of claim 13, wherein
the first log conversion unit is configured to execute the first gradation conversion processing using a first conversion table that defines the first gradation conversion characteristic for copying, and
the second log conversion unit is configured to execute the second gradation conversion processing using a second conversion table that defines the second gradation conversion characteristic for specific original detection.

15. The apparatus of claim 14, wherein the first log conversion unit is configured to execute density adjustment processing using a configurable density adjustment value.

16. The apparatus of claim 15, wherein the first gradation conversion characteristic for copying and a third gradation conversion characteristic for density
adjustment processing are defined in combination in the first conversion table.

17. The apparatus of claim 16, wherein only the second gradation conversion characteristic for specific original detection is defined in the second conversion table.

18. The apparatus of claim 13, wherein the specific-original detecting unit is configured to output a detection signal that indicates whether the original is the specific original.

19. The apparatus of claim 1, wherein the first log conversion unit and the second log conversion unit are provided independently from and parallel to each other.

20. The apparatus of claim 1, further comprising a control unit configured to prohibit an output operation of the output apparatus in response to detection by the specific-original detecting unit that the original is the specific original.

* * * * *